02-06-73 XR 3,715,497

250/203

United States Patent [19]

Cooper et al.

[11] 3,715,497

[45] Feb. 6, 1973

[54] OPTICAL SCANNER AND REAL TIME IMAGE CONVERSION SYSTEM

[75] Inventors: Erwin E. Cooper, Howard V. Kennedy, both of Dallas, Tex.

[73] Assignee: Texas Instruments Incorporated, Dallas, Tex.

[22] Filed: Jan. 2, 1969

[21] Appl. No.: 790,508

[52] U.S. Cl..................178/6.8, 178/DIG. 8, 178/7.6, 178/DIG. 20, 250/83 HP, 250/71.5 S, 250/203 R, 350/285

[51] Int. Cl.................................................H04n 3/00

[58] Field of Search......250/83.3 H, 83.3 HP, 71.5 S, 250/203 R; 178/7.6, 7.88; 350/7, 285

[56] References Cited

UNITED STATES PATENTS

| | | | |
|---|---|---|---|
| 3,548,192 | 12/1970 | Farmer et al. | 250/83.3 H |
| 3,510,191 | 5/1970 | Cannon | 350/7 |
| 3,563,146 | 2/1971 | Miller | 350/7 |
| 3,475,552 | 10/1969 | Makino et al. | 350/285 |
| 3,160,751 | 12/1964 | Dunning | 250/83.31 R |

*Primary Examiner*—Benjamin A. Borchelt
*Assistant Examiner*—N. Moskowitz
*Attorney*—Samuel M. Mims, Jr., James O. Dixon, Andrew M. Hassell, Harold Levine, Rene' E. Grossman, Melvin Sharp and Richards, Harris and Hubbard

[57] ABSTRACT

A system for converting infrared radiation in the 8–14 micron region to a real time visual image is disclosed. A lens system focuses the image at an image plane. A plurality of mirrors are disposed between the lens system and the image plane and are rotated about an axis intersecting the optical axis at the entrance pupil. Each mirror is disposed to focus an arcuate segment of the image onto a linear array of detectors located substantially on the axis of rotation as the mirror moves through the optical field of view. The image thus scanned is reconstituted at the target of a vidicon type television camera by the same type of system having mirrors rotated in synchronism with the scanning mirrors, but utilizing light emitters rather than light detectors. The video signal from the television camera is then displayed on a conventional television display tube for visual observation.

35 Claims, 6 Drawing Figures

OPTICAL SCANNER AND REAL TIME IMAGE CONVERSION SYSTEM

This invention relates generally to optical scanners, and more particularly relates to systems for converting invisible optical images to visible optical images in real time.

Systems for converting images carried by electromagnetic radiations in the spectral regions that are invisible to the human eye and converting these to images visible to the human eye have heretofore been devised for military reconnaissance and similar applications. The type which has received the greatest acceptance employs an optical scanning system utilizing counterrotating wedges to convert two circular scans into a single straight line scan moving in the horizontal direction. This scan is directed onto a continuous line of individual detector elements to provide vertical line resolution. Such a system is classed as an object plane scanner, and like object plane scanners generally, has the disadvantage of large size and weight, and high power dissipation. Another significant disadvantage of object plane scanners is that the magnifying power of the focusing optics cannot be changed without a marked loss in efficiency. Such a system also has inherent disadvantages in that it does not produce an exact straight line scan, does not have linear sensitivity over the length of the scan, is difficult to align, has poor optical transmission due to the large number of optical elements required, and does not have a stationary front optical element to serve as a window.

This invention is concerned with an improved optical scanner which is much smaller in size and weight, has a minimum number of parts, has a stationary front optical element which serves as a window, has easily interchangeable lens systems for optical "zooming" or changing the field of view, and can operate on a minimum number of detectors by multiplexing scanning mirrors.

The foregoing and other advantages are achieved by optically scanning the image plane, rather than the object plane, by means of one or more mirrors rotated about an axis extending through the image plane. Each mirror is disposed so as to intercept a strip of the image and reflect it onto a line of detectors disposed generally along the axis of rotation as the mirror rotates through the field of view of the optical system.

The optical scanner is utilized in an infrared light to visible light image conversion system by applying the amplified signal from each infrared detector to drive a corresponding light emitter of a linear array disposed along the axis of rotation of a second identical set of mirrors rotating in synchronism with the scanning mirrors. In accordance with another aspect of the invention, the reconstituted image is converted to a video signal by a video camera for display at a remote video receiving station as desired.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

Figure 1:
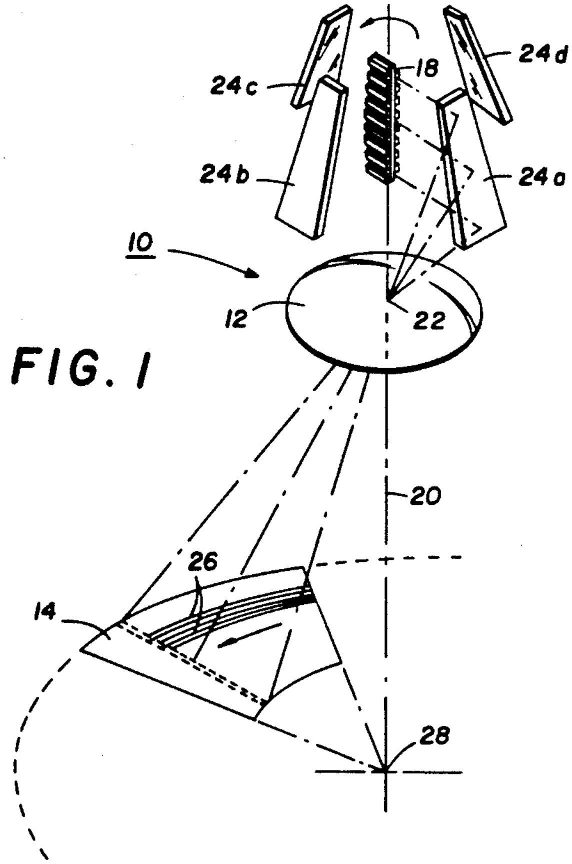
FIG. 1 is a schematic, isometric, optical diagram illustrating an optical scanning system in accordance with the present invention.
Figure 2:
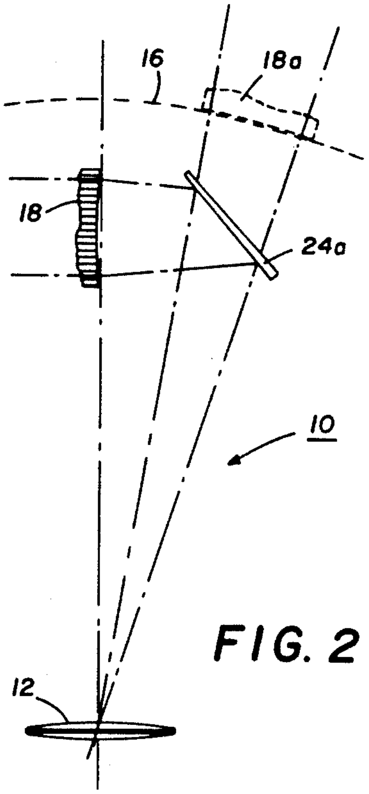
FIG. 2 is a two-dimensional optical diagram of the scanning system of FIG. 1.

Referring now to the drawings, an optical scanning system in accordance with the present invention is indicated generally by the reference numeral 10 in FIGS. 1 and 2. The system 10 includes a suitable lens system, represented by the single lens 12, for focusing electromagnetic radiations emanating from objects in a field of view 14 onto a spherically shaped image plane represented by the dotted line 16 in FIG. 2. A linear array of detectors 18 is disposed along the axis of rotation between the exit pupil 22 and the image plane 16, and has a curvature corresponding to the curvature of the image plane 16. Four mirrors 24*a* –24*d* are mounted for rotation about the axis 20 and are disposed between the lens 12 and the image plane 16 at an angle such as to continually focus a radially extending strip of the image onto the line of detectors 18. Rotation of each of the mirrors 24 *a* 24*d* is the optical equivalent of positioning the detector array 18 at 18*a* on the image plane 16, as illustrated in FIG. 2, and pivoting the array through a short scanning arc about the axis 20. As a result, each of the respective detectors 18 scans an arc 26 across the field of view 14, and the scanned arcs are concentric about a common point 28 on the axis 20. The width of the scanning arcs, and thus the resolution, is dependent upon the number and size of the detectors. Four hundred detectors are typically used for full line coverage.

An important advantage of the scanning system 10 is that the lens system 12 can be changed as desired so long as the common image plane 16 is maintained. The spherical image plane materially simplifies the optical system 12, although the linear detector array 18 must then have a curvature corresponding to that of the image plane 16 in order to obtain optimum focusing. This requirement can be relatively easily met when utilizing a solid state detector array of the type which will presently be described. An image plane having a different curvature or a flat image plane could be employed if desired. Also, the mirrors 24*a*–24*d* could be contoured to obtain focusing, if desired, although such an approach is not very practical.

The detector array 18 may have a continuous line of detectors sized to achieve the desired line resolution. In such a case, all of the mirrors 24*a*–24*d* are preferably disposed at the same angle with respect to the axis of rotation 20 so that each detector scans the same arcuate path 26 four times during each revolution of the mirror assembly, one scan being made each time a mirror passes through the optical path from the field of view.

Another advantage of the system 10 is that the detectors 18 can be spaced apart so that the number used is less than that required for full line coverage. The mirrors 24*a*–24*d* are then set at different angles to the axis 20 so that each mirror causes a detector to scan a different arc 26. Thus, during each revolution of the mirror assembly, each individual detector of the array 18 would scan four separate scanning lines 26, one reflected from each of the four mirrors. This approach has the disadvantage that a complete scan of the object requires four times as long, and failure of one detectors erases four scan lines.

The mirrors 24*a*–24*d* can also be indexed at different angles to the axis of rotation 20 when the detector array 18 has sufficient number of detectors to provide full coverage. Then each arcuate scan line 26 will be successively projected onto four different detectors during a single revolution of the mirror assembly. This arrangement prevents completely missing a line of information if a detector is inoperative, and produces more uniform coverage if the detectors are not perfectly balanced. However, such an arrangement also has the disadvantage of adversely affecting four lines instead of one in the event of an inoperative detector.

In accordance with another important aspect of the invention, the same scanning technique may be used to reconstitute the scanned image. This is achieved merely by substituting light sources for the light detectors, driving the light sources with an amplified signal produced by the respective detectors, and rotating mirrors used to scan the image. Thus, if the detectors are sensitive to invisible electromagnetic radiation, such as infrared radiation, and the light sources of the display system produce visible light, an invisible infrared image can be converted to a visible light image which can be viewed by the human eye, or processed as desired.

Figures 3, 4, 5:
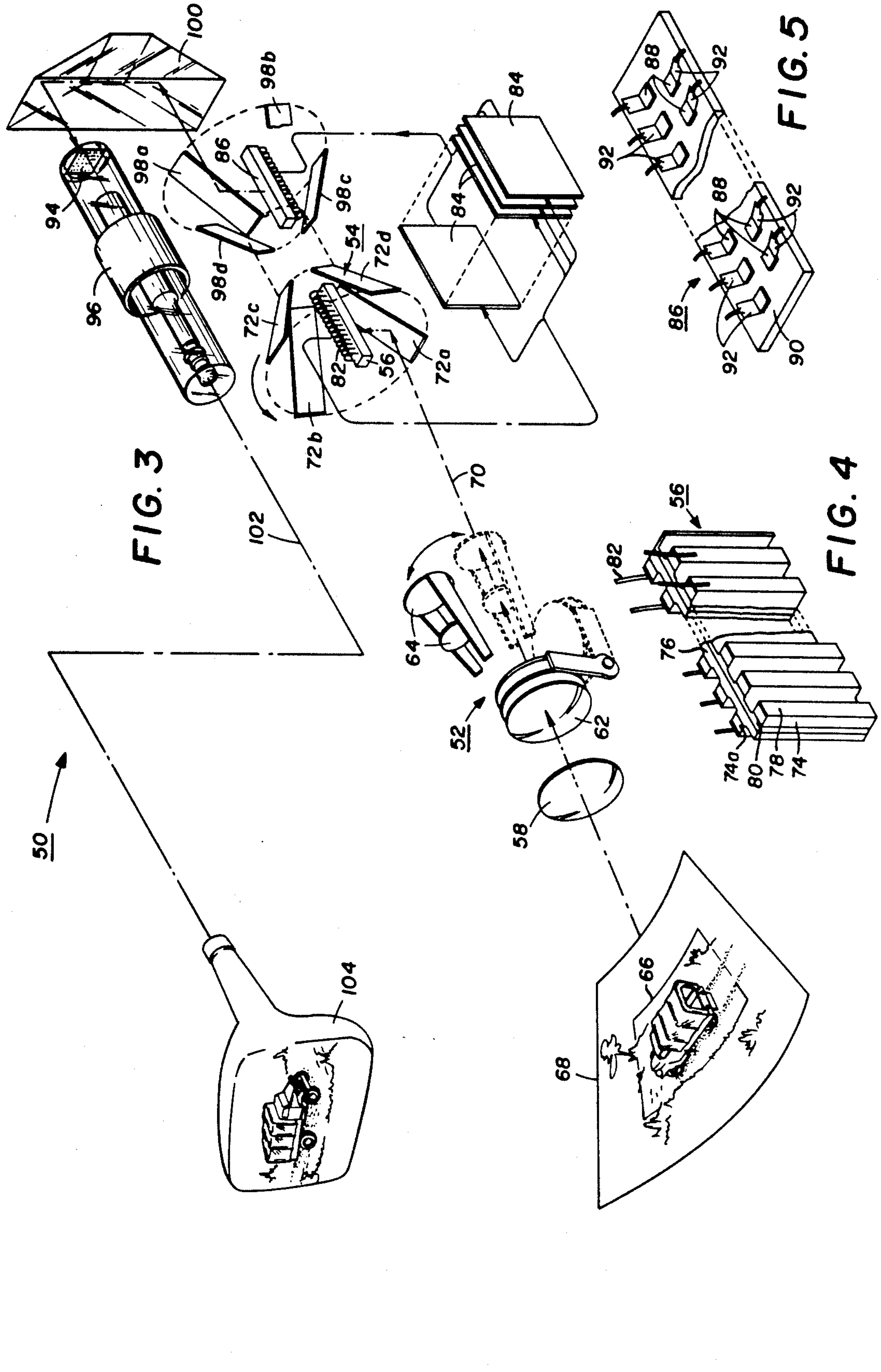
FIG. 3 is a schematic, isometric diagram of a system for converting an infrared image to a visible image in real time utilizing the scanning system.
FIG. 4 is a simplified isometric view of the infrared detector array of the system of FIG. 3.
FIG. 5 is a simplified isometric view of the light emitter array of the system of FIG. 3.

Referring now to FIG. 3, a system for converting, in real time, an infrared image to a video signal, and then to a visible image, is indicated generally by the reference numeral 50. The system 50 utilizes a lens system 52, a rotating mirror assembly 54, and a linear array of detectors 56 which perform the same functions as the lens system 12, the mirrors 24*a* –24*d* and the linear detector array 18 of the scanning system 10 described in connection with FIGS. 1 and 2. The lens system 52 includes a stationary lens 58 which functions as a window for the pressurized housing of the system. The stationary lens 58 is used with either a tracking lens assembly 62 or a search lens assembly 64. When the tracking lens assembly 62 is in the active position shown in solid outline, the search lens assembly 64 is in the inactive position shown in solid outline, and the field of view is that represented by area 66. Alternatively, when the tracking lens assembly 62 is pivoted into the inactive position represented in dotted outline, the search lens assembly 64 is pivoted into the active position shown in dotted outline, and the field of view of the system is enlarged to include the area 68. Either the object area 66 or 68 is projected generally along the optical path 70 and reflected onto the array of detectors 56 by the mirrors 72*a*–72*d* in the manner heretofore described in connection with the system 10.

The detector array 56 may be of any conventional type. However, in accordance with a specific aspect of the invention, the array 56 is a solid state array of the type illustrated generally in FIG. 4. The array 56 is comprised of a plurality of mercury doped germanium bars 74 each of which is mounted at staggered positions on opposite sides of a substrate 76 to provide continuous linear coverage. A pair of electrodes 78 and 80 are in electrical contact with opposite faces of the bar. The electrodes 80 adjacent the substrate 76 are electrically common, and individual lead wires 82 are connected to the electrodes 78. The mercury doped germanium produces an electric current between the electrodes which is modulated by the electromagnetic energy in the 8 –14 micron region that enters the respective bars through the lower ends 74*a* which are facing the scanning mirrors as they traverse the optical path. The 8 –14 micron region is around an infrared band of the electromagnetic frequency spectrum that is least attenuated by meteorological conditions.

The electrical signal produced by each individual detector 74 is amplified by means of a separate channel, represented by the integrated circuit blocks 84, and then applied to drive a corresponding light emitter element of a linear array of light emitters 86. The array of light emitters 86 may comprise any suitable array of light sources, but preferably comprises an array of gallium arsenide diodes such as illustrated in FIG. 5. The array 86 is comprised of the same number of gallium arsenide diodes 88 arrayed in the same staggered configuration, and on the same scale as the detectors 74. Each diode is formed by diffusion into a substrate 90, and separate electrical leads are connected to expanded contacts 92 for each of the diodes 88. The other terminals of the diodes are electrically common. The light emitted by the diodes has a wavelength of 0.9 microns.

The light produced by the emitter array 86 is then projected onto the target 94 of a vidicon type camera 96 by means of a display device in accordance with this invention and a prism 100. The display device is comprised of four mirrors a–982 which are mechanically coupled to and rotated with mirrors 72*a*–72*d*. The light emitters of the array 86 are disposed in a straight line along the axis of rotation of the mirrors 98a–98*d* so that the image 66 or 68, as the case may be, is reconstituted and focused on the planar target 94 of the camera 96.

The camera 96 is of the general type described in an article entitled "A Charge-Storage Diode Vidicon Camera Tube" published in IEEE Transactions on Electron Devices, Vol. Ed–14, No. 6, June 1967 and operates in the same general manner as a standard vidicon television camera. The silicon diode target is particularly sensitive to the 0.9 micron energy emitted by the array 86. The camera 96 may use standard broadcast scan rates, or special scan rates, to produce a video signal represented at output 102, which may then be used to operate a conventional television receiver tube 104 to visually reproduce the image 66 or 68. The link 102 between the camera 96 147 and the display tube 104 may be a cable, or the video signal may be broadcast or otherwise transmitted using any conventional system.

The system 50 thus converts an image in the invisible 8–14 micron region to a visible image. Of course, it will be appreciated that the image reproduced by the emitter array 86 and mirrors 98*a*–98*d* could be in the visible spectrum, or any other desired spectrum, merely by changing the nature of the light emitters, and that the reconstituted image can be easily processed in any other manner desired.

Figure 6:
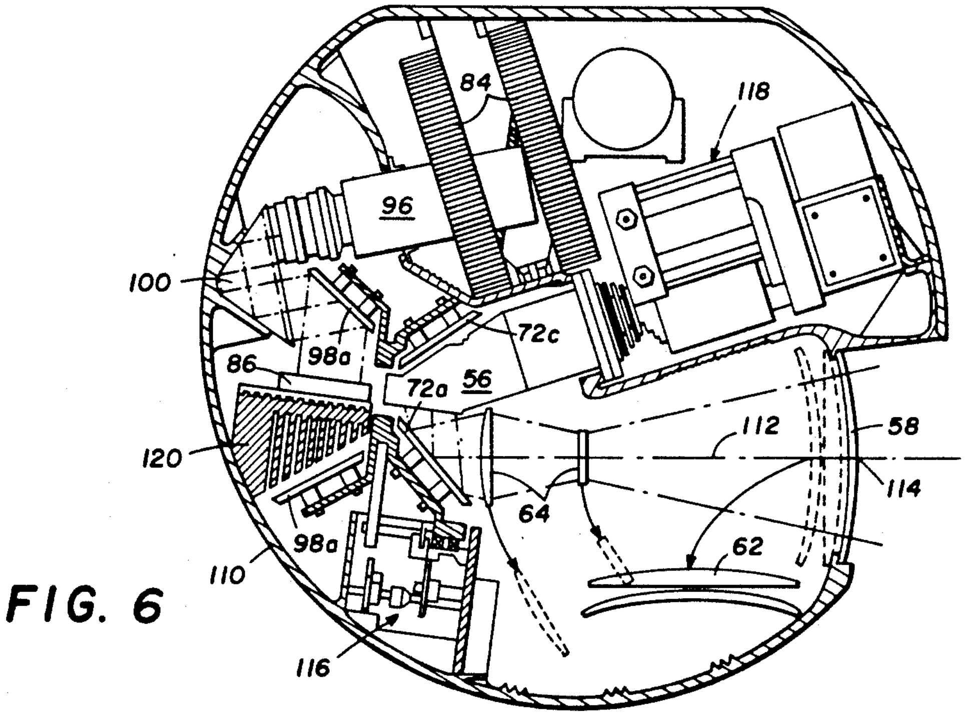
FIG. 6 is a simplified vertical sectional view of the physical layout of the system of FIG. 3.

As previously mentioned, one of the important advantages of the system 50 is that it embodies a relatively small number of components which are relatively lightweight and which can be housed in a compact unit. Such a unit is shown in FIG. 6, where corresponding components are designated by corresponding reference characters. The stationary lens 58 forms the viewing window for a pressurized spherical housing 110. The spherical housing is typically mounted so that it can be pivoted about both the pitch and yaw axis of an aircraft to facilitate aiming the optical axis 112 at the desired target. The search lens system 64 is shown in the active position in FIG. 6, and the tracking lens system 62 in the inactive position. The optical axis 112 is disposed at an angle to the axis of rotation of the mirrors 72*a* -72*d* in order to place the center of the field of view on the optical axis and to reduce the size of the lenses. However, the axis of rotation of the mirror assembly 54 intersects the optical axis 112 at the center of curvature of the spherically shaped image surface of the lens system so that the object will always be focused onto the linear detector array 56. The mirror assembly 54 is driven by the mechanism indicated generally by the reference numeral 116. The mercury doped germanium detectors 56 are cooled by a conventional cooling system indicated generally by the reference numeral 118. The emitter array 86 is mounted on cooling fins 120. The amplifiers 84, mirrors 98*a*-98*d*, prism 100 and camera 96 are located as shown. Of course, the visual display 104 is located remote from the housing 110 in the aircraft.

Although a preferred embodiment of the invention has been described in detail, it is to be understood that various changes, substitutions and alterations can be made therein without departing from the spirit and scope of the invention as defined by the appended claims.

What is claimed is:

1. In an optical scanning system, the combination of:

at least one mirror mounted for rotation generally within a cone of rotation, an optical system having an optical axis for projecting an image onto a segment of the cone of rotation such that a radial line of the image is always reflected by the mirror onto a common image line disposed within the cone of rotation, and a plurality of detectors disposed along the image line each adapted to produce a signal proportional to the electromagnetic energy striking the respective detector whereby each detector detects an arcuate segment of the image

2. The combination of claim 1 wherein the axis of the cone of rotation intersects the axis of the optical system at the exit pupil.

3. The combination of claim 1 wherein the image plane of the optical system is spherical and the detectors lie generally along a line having a radius of curvature corresponding to the radius of curvature of the image plane.

4. The combination of claim 1 wherein the optical system includes at least two alternatively selectable systems having different fields of view and a common image plane.

5. The combination of claim 1 wherein there are a plurality of mirrors mounted for rotation within the cone of rotation.

6. The combination of claim 5 wherein at least two of the mirrors are disposed at different angles to the axis of rotation of the cone of rotation such that different arcs of the image will be directed onto a common detector by the respective mirrors.

7. The combination of claim 1 further comprising:

a corresponding number of second mirrors mounted for rotation in a second cone of rotation in synchronism with said at least one mirror, a number of emitters corresponding to the number of detectors disposed along the axis of rotation of the second cone of rotation in substantially the same spatial relationship as the corresponding detectors, and an amplifier channel interconnecting each detector and the corresponding emitter for amplifying the electrical signal from the respective detector and driving the corresponding emitter to produce electromagnetic energy proportional to the energy striking the respective detector.

8. The combination of claim 7 further characterized by means for converting the image produced by the energy emissions from said emitters and the rotating second mirrors to a video signal suitable for operating a cathode ray tube.

9. The combination of claim 8 wherein the detectors are sensitive to energy in the invisible spectrum.

10. The combination of claim 8 wherein the means for converting the image comprises a television camera responsive to the energy from by the emitters and further characterized by a television receiver for producing a visible image from the video signal produced by the television camera.

11. In an image converter system, the combination of:

first and second sets of mirrors, the mirrors of the first set being mounted for rotation in a first cone of rotation and the mirrors of the second set being mounted for rotation in a second cone of rotation and in synchronism with said first set, a plurality of detectors arrayed generally along the axis of the first cone of rotation for detecting energy from an image reflected from the mirrors of the first set as the mirrors are rotated, a plurality of emitters arrayed generally along the axis of the second cone of rotation, the emitters generally corresponding in number and position to the detectors, and an amplifier channel interconnecting each detector and the corresponding emitter for causing the emitter to emit energy proportional to the energy striking the corresponding detector whereby the image will be reconstituted by the output from the emitters and reflected by the second set of mirrors.

12. The combination of claim 11 further characterized by means for converting the reconstituted image to a video signal.

13. The combination of claim 11 wherein the detectors are sensitive to infrared energy having a wavelength between 8 and 14 microns.

14. The combination of claim 11 wherein the detectors are germanium doped with mercury.

15. The combination of claim 14 wherein the emitters are gallium arsenide diodes.

16. The combination of claim 15 wherein the reconstituted image is focused onto the target of a video tube, the target being an array of silicon diodes.

17. In an optical system, the combination of:

a linear array of light emitters disposed generally along an axis, and at least one mirror rotating about the axis and disposed at an angle to the axis for reflecting the energy from the emitters whereby an image comprised of a plurality of circular arcs of energy each modulated in accordance with a signal applied to the respective emitter will be produced.

18. The combination of claim 9 wherein the emitters emit in the visible portion of the spectrum.

19. The combination of claim 11 wherein said first and second sets of mirrors are mechanically coupled to synchronize rotation therebetween.

20. The combination of claim 12 wherein said means for converting the image comprises a television camera responsive to the energy from said emitters and a television receiver for producing a visible image from the video signal produced by said television camera.

21. An image conversion system comprising:

electromagnetic energy emitters and detectors on an axis, at least one mirror associated with said emitters and at least one mirror associated with said detectors, each of the mirrors disposed at an angle to said axis and synchronized for movement about said axis, and electronic means coupling the emitters and detectors for causing the emitters to emit energy related to the energy striking detectors.

22. The system according to claim 21 wherein there are a plurality of mirrors associated with said emitters and said detectors.

23. The system according to claim 21 wherein the energy detected by said detectors is infrared energy between 8 and 14 microns.

24. The system according to claim 21 wherein the emitters emit energy in the invisible portion of the spectrum.

25. The system according to claim 21 wherein the emitters emit energy in the visible portion of the spectrum.

26. In an optical scanning system the combination of:

a plurality of mirrors mounted for rotation about an axis, an optical system for projecting an image onto said plurality of mirrors such that a radial line of the image is reflected by said plurality of mirrors onto a common image line disposed generally on said axis, a plurality of detectors disposed generally along the image line, each producing a signal related to the energy striking the respective detectors, a corresponding number of second mirrors mounted for rotation about said axis, a plurality of emitters disposed generally along said axis, and electronic means interconnecting said detectors and emitters, said emitters producing an output related to the energy striking said detectors.

27. The system of claim 26 further characterized by means for converting the output from said emitters to a video signal.

28. The system of claim 27 wherein the means for converting the image comprises a television camera responsive to the output from said emitters.

29. The system of claim 28 further including a television receiver for producing a visible image from the video signal produced by the television camera.

30. The system of claim 26 wherein the number of said plurality of light emitters correspond to the number of said detectors.

31. An image conversion system comprising:

a plurality of mirrors mounted for rotation within a cone of rotation, an array of electromagnetic emitters and detectors located within a cone of rotation, and electronic means interconnecting said detectors and emitters, said emitters producing signals related to the energy impinging on said detectors.

32. An image conversion system comprising:

at least two mirror surfaces on a common mounting element and mounted for movement about a common axis, a plurality of detectors for detecting energy from one of said mirror surfaces, a plurality of emitters for emitting energy onto the other mirror surface, and electronic means coupling said emitters and detectors for causing the emitters to emit energy related to the energy striking the detectors.

33. A system according to claim 32 wherein said mirror surfaces are mechanically coupled for synchronization.

34. A system according to claim 33 wherein said electronic means includes an amplifier channel interconnecting each detector and corresponding emitter.

35. A system according to claim 32 further including means for converting the energy from the emitters striking said at least one mirror to a video signal.

* * * * *